United States Patent [19]
Kanai et al.

[11] Patent Number: 6,086,704
[45] Date of Patent: Jul. 11, 2000

[54] METHOD OF MANUFACTURING AN OPTICAL CONNECTOR

[75] Inventors: Ken Kanai, Ichihara; Jun Yamakawa, Chiba; Naoko Shimoji, Ichihara; Shinji Nagasawa, Mito, all of Japan

[73] Assignees: The Furukawa Electric Co. Ltd.; Nippon Telegraph and Telephone Corporation, both of Tokyo, Japan

[21] Appl. No.: 09/095,181

[22] PCT Filed: Oct. 14, 1997

[86] PCT No.: PCT/JP97/03688

§ 371 Date: Jun. 10, 1998

§ 102(e) Date: Jun. 10, 1998

[87] PCT Pub. No.: WO98/16856

PCT Pub. Date: Apr. 23, 1998

[30] Foreign Application Priority Data

Oct. 16, 1996 [JP] Japan .................................. 8-294599

[51] Int. Cl.[7] ................................ G02B 6/24; G02B 6/40
[52] U.S. Cl. .......................... 156/267; 156/293; 156/294; 156/296; 385/60; 385/80
[58] Field of Search ................... 385/78, 60, 59, 385/80; 156/267, 293, 294, 296

[56] References Cited

FOREIGN PATENT DOCUMENTS 63-500684  3/1988  Japan .
7-43546    2/1995  Japan .

OTHER PUBLICATIONS

PCT International Application No. PCT/JP97/03688 Int'l Search Report.

*Primary Examiner*—Sam Chuan Yao
*Attorney, Agent, or Firm*—Lacasse & Associates; Randy W. Lacasse

[57] ABSTRACT

The invention is directed to a method of manufacturing an optical connector according to which it is possible to adjust a projection length a bare optical fiber (7) projects from a connection end surface (3) of a ferrule (1). At a step (a), an optical fiber cored line (5) is inserted through and attached to an optical fiber insertion hole (4) of the ferrule (1), and the bare optical fiber (7) and the ferrule (1) are bonded to each other by hardening a heat-hardening adhesive (11) at a first hardening temperature. Next, at a step (b), the connection end surface (3) is ground so that the connection end surface (3) becomes flat and flush with a tip surface of the bare optical fiber (7). Following this, at a step (c), the heat-hardening adhesive (11) is heated again to be hardened at a temperature which is higher than the first hardening temperature, so that a tip of the bare optical fiber (7), causing pistoning due to the reheat hardening, projects from the connection end surface (3). The quantity of the projection is adjusted by controlling one or both of the rehardening temperature and a holding time at the rehardening temperature.

2 Claims, 3 Drawing Sheets

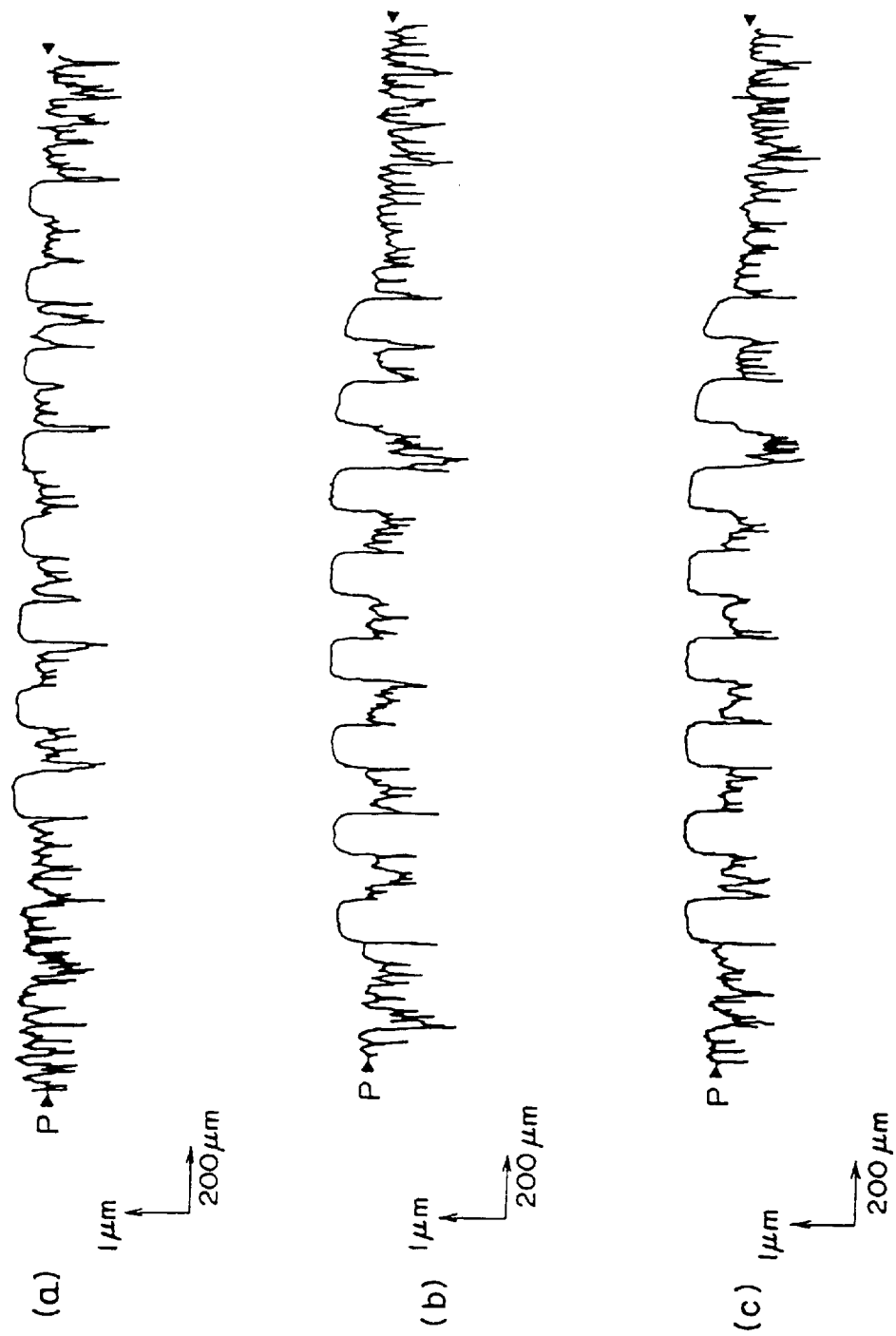

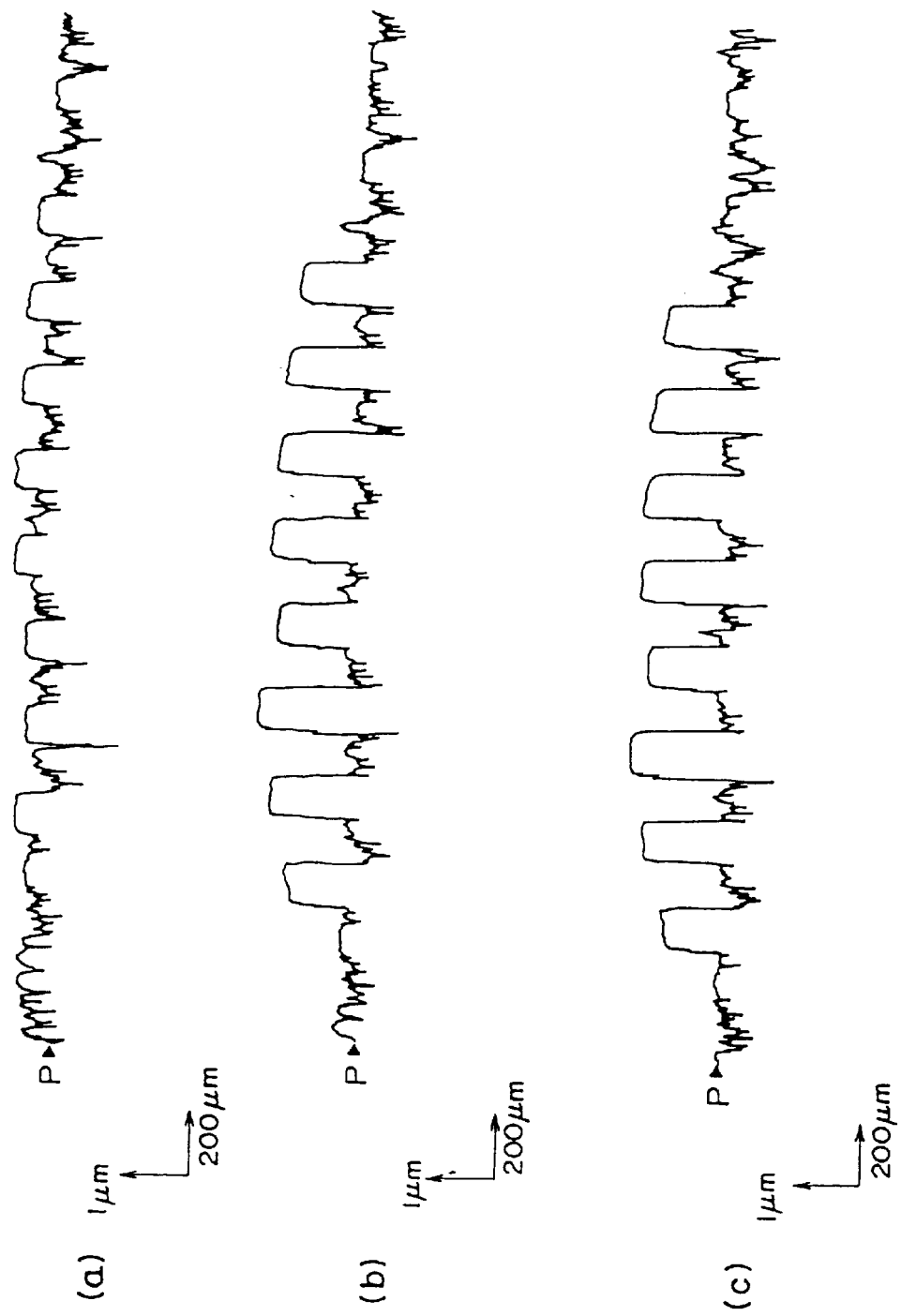

METHOD OF MANUFACTURING AN OPTICAL CONNECTOR

TECHNICAL FIELD

The present invention is related to a method of manufacturing an optical connector in which a connection tip of an optical fiber projects a little longer from a connection end surface of the optical connector.

BACKGROUND ART

A conventional optical connector is obtained by forming an optical fiber insertion hole which penetrates between a rear end of a ferrule and a connection end surface which is a front end of the ferrule, thereafter inserting an optical fiber through the optical fiber insertion hole from the rear end side toward a tip, thereafter fixedly bonding the optical fiber and the ferrule using a heat-hardening adhesive which contains an epoxy or the like, and thereafter grinding the connection end surface together with a tip surface of the optical fiber.

When this type of optical connectors are to be connected to each other, connection end surfaces of one optical connector and the other optical connector are abutted against each other after aligning the optical connectors to each other in such a manner that an optical fiber of one optical connector is abutted against an optical fiber of the other optical connector without any positional displacement, whereby the optical fibers are connected to each other through the connectors.

Since connection of optical fibers to each other using this type of optical connectors is a method of connecting optical fibers to each other which requires to abut connection end surfaces of the optical connectors against each other, if a small gap is created between the optical fiber of one of the optical connectors and the optical fiber of the other one of the optical connectors, reflection of light or the like is created at the gap, which increases a connection loss. To deal with this, when optical connectors are to be connected to each other, a matching agent (matching oil) is applied to connection end surfaces of the optical connectors so that an inconvenience such as reflection of light is prevented when the optical connectors are connected to each other.

However, applying a matching agent every time optical connectors are connected to each other is very much burdensome, and therefore, it is impossible to enhance the operability of connecting optical connectors to each other. Against the backdrop, recent years have seen an increased use of optical connectors of a physical contact type which allows optical fibers to be connected to each other without using a matching agent. An optical connector of the physical contact type is manufactured by grinding a connection end surface of a ferrule using a buff after inserting an optical fiber through the ferrule and fixing the optical fiber therein. Buff grinding is performed utilizing a fact that the ferrule whose hardness is small is chipped off more than the optical fiber whose hardness is large, thereby allowing the optical fiber to project a little longer from the connection end surface of the ferrule.

When optical fibers are to be connected to each other using optical connectors of the physical contact type, connection end surfaces of the connectors are abutted against each other and the optical fibers of the optical connectors which project a little longer from the connection end surfaces are accordingly brought into a direct pressure contact with each other so that reflection of light or the like at this contact portion is prevented, which in turn makes it possible to connect the optical fibers to each other without using a matching agent and hence with only a small connection loss.

An optical connector mounting an optical fiber cored line may contain only one line. However, with a recent tendency toward optical communication with a large capacity, a ferrule mounting containing more than one optical fibers of cable conductors is in a popular use.

During fabrication of a multi-cored optical connector of the physical contact type, in particular, when a connection end surface of a ferrule in which multi-cored optical fibers are arranged is ground using a buff in an effort to allow tips of the optical fibers to project from the end surface of the ferrule as conventionally performed, since the buff is soft, as it is known in the art, the buff chips off different quantities at different positions, so that the multi-cored optical fibers are ground away different quantities and projection lengths of the optical fibers accordingly become different from each other. This degrades the performance of connecting the multi-cored optical fibers and makes it impossible to perform reliable connection of the optical fibers.

The present invention has been made to solve such a problem. Accordingly, an object of the present invention is to obtain a method of manufacturing an optical connector which, even if an optical connector is a multi-cored optical connector, allows optical fibers each containing a cored-line to project evenly from a connection end surface and adjusts the projection so that the quantities of the projection are optimum.

DISCLOSURE OF THE INVENTION

The present invention uses the following means to achieve the object above. That is, in a first aspect of the invention, means for solving the problem is a structure in which an optical fiber is inserted through a fiber insertion hole which opens at a connection end surface of a ferrule, a heat-hardening adhesive is thereafter injected between the ferrule and the optical fiber, the heat-hardening adhesive is thereafter hardened in an atmosphere at a first hardening temperature, the connection end surface of the ferrule is thereafter ground together with an end surface of the optical fiber so that the surfaces become flat with each other, and an integrated and bonded unit of the ferrule and the optical fiber as they are bonded to each other are thereafter kept in an atmosphere at a rehardening temperature which is higher than the first hardening temperature so that a tip of the optical fiber projects from the connection end surface of the ferrule.

In a second aspect of the invention, means for solving the problem is a structure which comprises the structure according to the first aspect and in which a projection length the tip of the optical fiber projects from the connection end surface of the ferrule is adjusted by controlling at least one of the rehardening temperature and a holding time at the rehardening temperature.

In a third aspect of the invention, means for solving the problem is a structure which comprises the structure according to the first or the second aspect and in which the rehardening temperature is higher than a glass-transition temperature of the heat-hardening adhesive which is obtained at the first hardening temperature.

In the invention with such a structure as above, the optical fiber is inserted through the ferrule, and after hardening using the heat-hardening adhesive in an atmosphere at the first hardening temperature, the connection end surface of the ferrule is ground so that the connection end surface of the ferrule and a tip surface of the optical fiber become flat and flush with each other.

Next, in an initial stage of rehardening the integrated and bonded unit of the ferrule and the optical fiber in an atmosphere at the rehardening temperature, as the rehardening temperature is higher than the first hardening temperature, the optical fiber which is inserted through and fixed to the ferrule causes a phenomenon called pistoning and accordingly projects from the connection end surface of the ferrule. When the rehardening temperature is higher than a glass-transition temperature $T_g$ of the heat-hardening adhesive which is obtained at the first hardening temperature, in particular, as a heating temperature exceeds the glass-transition temperature $T_g$, the heat-hardening adhesive becomes a rubber-like state, a Young's modulus of the heat-hardening adhesive drops to about ⅓, and a holding power of the optical fiber becomes small, so that the optical fiber projects in a larger quantity. The quantity of the projection is adjusted by the rehardening temperature and a holding time in the atmosphere at the rehardening temperature.

In short, the higher the rehardening temperature is, or the longer the holding time in the atmosphere at the rehardening temperature is, the more the optical fiber projects.

The projection length the optical fiber projects from the connection end surface of the ferrule is adjusted by controlling one or both of the rehardening temperature and the holding time in the atmosphere at the rehardening temperature. Therefore, even if an optical connector is a multi-cored optical connector, projection lengths optical fibers of cable conductors project are adjusted to be uniform.

The present invention requires that after hardening an optical fiber which is inserted through a ferrule using the heat-hardening adhesive at the first hardening temperature, the connection end surface of the ferrule is ground so that the connection end surface of the ferrule and the tip surface of the optical fiber become flat and flush with each other, and that the projection length the optical fiber projects from the connection end surface of the ferrule is adjusted by controlling one or both of the rehardening temperature and the holding time at the rehardening temperature, and therefore, it is possible to solve the problem of uneven projection lengths of optical fibers which is associated with conventional buff grinding for setting the projection lengths of the optical fibers, and to set the projection lengths of the optical fibers proper as designed. Further, since it is possible to adjust the projection lengths of the optical fibers equal to each other, it is possible to perform reliable connection of optical fibers using optical connectors of the physical contact type which are manufactured by the method according to the present invention, to connect the optical fibers through the connectors with a small loss, and to enhance the reliability of the connection of the optical fibers.

In addition, since reheat hardening is executed at the rehardening temperature which is higher than the glass-transition temperature of the heat-hardening adhesive which is obtained at the first hardening temperature, during the reheat hardening, the heat-hardening adhesive reaches the glass-transition temperature and the holding power of the optical fiber is accordingly weakened, and therefore, the optical fiber projects more. Thus, it is possible to adjust the projection length of the optical fiber in an efficient manner. Further, since the reheat hardening is performed at the rehardening temperature which is higher than the glass-transition temperature of the heat-hardening adhesive which is determined by the first hardening temperature, it is possible to increase the glass-transition temperature of the heat-hardening adhesive in accordance with the reheating temperature. When the rehardening temperature is set higher than a temperature at which the optical connector is to be used, in particular, the glass-transition temperature of the heat-hardening adhesive is set higher than the temperature at which the optical connector is to be used, and hence, while the optical connector is used, the heat-hardening adhesive reaches the glass-transition temperature and accordingly weakens the holding power. This prevents a phenomenon that the optical fiber projects again due to pistoning and the projection length of the optical fiber accordingly changes, and therefore, enhances the reliability of the optical connector over a long term.

BRIEF DESCRIPTION OF THE DRAWINGS

FIGS. 2(a) to 2(c) are views showing a projection length of an optical fiber which is measured using a surface roughness meter, after ground at a rehardening temperature of 90° C., after reheat hardening and after application of heat shock; and FIGS. 3(a) to 3(c) are views showing a projection length of an optical fiber which is measured using a surface roughness meter, after ground at a rehardening temperature of 100° C., after reheat hardening and after application of heat shock.

BEST MODE FOR CARRYING OUT THE INVENTION

Figure 1:
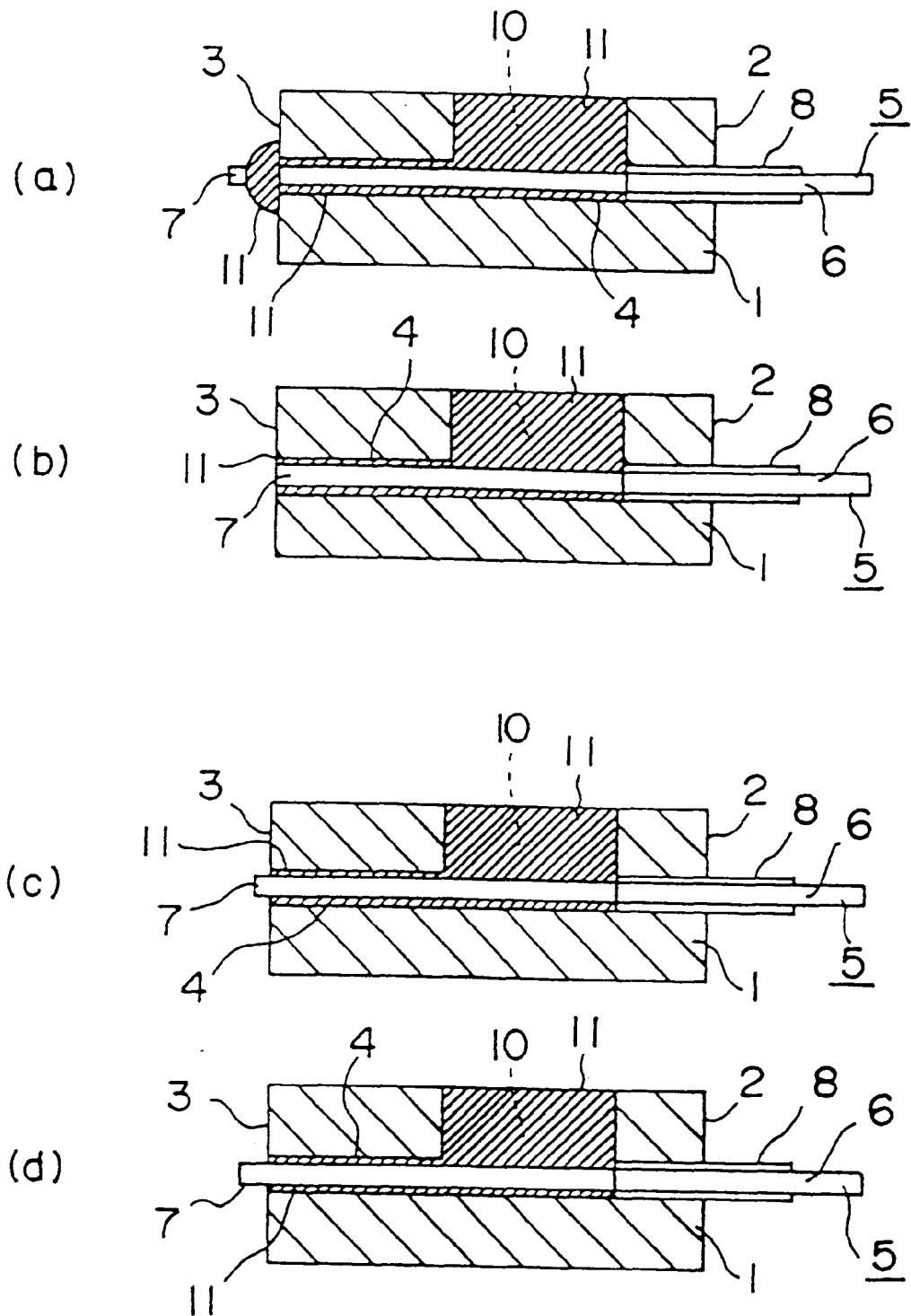
FIGS. 1(a) to 1(d) are explanatory diagrams of a preferred embodiment, showing steps of a method of manufacturing an optical connector according to the present invention.

The present invention will be described in detail with reference to the associated drawings. FIGS. 1(a) to 1(d) show steps of a method of manufacturing an optical connector according to a preferred embodiment of the present invention. In FIGS. 1(a) to 1(d), a ferrule 1 is formed using an epoxy resin, and an optical fiber insertion hole 4 is formed penetrating from a rear end surface 2 of the ferrule and a connection end surface 3 which is a front end surface of the ferrule. At a tip end of the optical fiber insertion hole 4, an optical fiber cable conductor 5 is inserted in such a manner that a bare optical fiber 7 with a sheath 6 removed projects from the connection end surface 3 of the ferrule 1. At a base end of the optical fiber insertion hole 4, the sheath 6 of the optical fiber cored line 5 is inserted in the optical fiber insertion hole 4.

A boot 8 is fit between the optical fiber cored line 5 and the optical fiber insertion hole 4 at the rear end of the ferrule, if necessary. An opening width in a vertical direction of the base end side of the optical fiber insertion hole 4 at the rear end is larger than a diameter of a hole through which the bare optical fiber 7 is inserted at the tip of the optical fiber insertion hole 4.

If the optical fiber cored line 5 is multi-cored, a corresponding number of bare optical fibers 7 which corresponds to the number of cores are inserted through and arranged in the ferrule 1.

In the ferrule 1, an adhesive injecting hole 10 is formed in the middle of the optical fiber insertion hole 4, in such a manner that the adhesive injecting hole 10 is linked to the optical fiber insertion hole 4. At the step shown in FIG. 1(a), the optical fiber cored line 5 is inserted through the optical fiber insertion hole 4 of the ferrule 1 to such a position which allows the bare optical fiber 7 to project from the connection end surface 3 of the ferrule 1 through the optical fiber insertion hole 4, and in this condition, a heat-hardening adhesive 11 containing an epoxy is injected through the adhesive injecting hole 10. The heat-hardening adhesive 11 flows into the optical fiber insertion hole 4 and fills up a gap between the bare optical fiber 7 and the optical fiber insertion hole 4.

After injecting the heat-hardening adhesive 11, the ferrule 1 is placed in a heating furnace with the heat-hardening adhesive 11 injected. A temperature within the heating furnace is kept at a first hardening temperature for hardening the heat-hardening adhesive 11. The ferrule 1 is held within the furnace for a predetermined period of time, to thereby harden the heat-hardening adhesive.

At the first step for hardening the heat-hardening adhesive, the first hardening temperature is set low, a holding time for holding within the furnace is set short, and the glass-transition temperature $T_g$ of the heat-hardening adhesive 11 is set low.

When cooled under a certain condition from a liquid state, a polymer material including the heat-hardening adhesive freezes into a glass state after becoming a supercooled liquid. Such a transition from a supercooled liquid into a glass state without crystallization is called glass transition, and a temperature of the glass transition is called the glass-transition temperature $T_g$. The heat-hardening adhesive of a hardened state, when heated up from a room temperature, changes from the glass state into a rubber-like elastic state at the glass-transition temperature $T_g$. The heat-hardening adhesive have largely different properties before and after reaching the glass-transition temperature $T_g$. For example, as the heated heat-hardening adhesive exceeds the glass-transition temperature $T_g$, the resin softens, and hence, the bonding strength remarkably degrades and the coefficient of linear thermal expansion increases double or triple.

While the initial glass-transition temperature $T_g$ of the heat-hardening adhesive is determined by the initial hardening temperature (i.e., the first hardening temperature) and the holding time at the initial hardening temperature, the glass-transition temperature is also related to a crosslinking density of the heat-hardening adhesive. Therefore, as heating for rehardening is performed at a temperature which is higher than the glass-transition temperature which is determined by the initial heating for hardening, the glass-transition temperature changes to a value which corresponds to the reheating temperature and a holding time at the reheating temperature. The preferred embodiment utilizes such a change in the glass-transition temperature.

FIG. 1(b) shows a step of performing grinding. As described earlier, grinding is executed after connecting and fixing the optical fiber cored line 5 to the ferrule 1 using the heat-hardening adhesive 11. The grinding does not use a buff as customarily performed in the conventional technique, but uses a grinding board made of a grind stone or tape grinding as that proposed in Japanese Patent Application No. Hei-8-29911 which was filed by the applicant of the present application, to thereby grind the connection end surface 3 of the ferrule 1 and a tip surface of the bare optical fiber 7 so that the surfaces become flat and flush with each other.

Following this, after this grinding, the ferrule 1 with the optical fiber cored line 5 fixed thereto is placed in the heating furnace and rehardening is performed by heating the heat-hardening adhesive 11 once again. FIG. 1(c) shows a step of the reheat hardening. The rehardening temperature within the heating furnace during the reheat hardening is set higher than the first hardening temperature which is used at the step of FIG. 1(a), and a holding time in an atmosphere at the rehardening temperature is set longer. In the preferred embodiment, heating is performed at a temperature which is higher than the glass-transition temperature $T_g$ of the heat-hardening adhesive 11 which is determined by the first hardening temperature which is used at the step of FIG. 1(a) and the holding time at the first hardening temperature.

During the heating at the rehardening temperature, heated at a temperature which is higher than the glass-transition temperature, the heat-hardening adhesive 11 becomes a rubber state, the Young's modulus of the heat-hardening adhesive drops to about ⅓, and an adhesion holding power of the optical fiber (i.e., the bare optical fiber 7) decreases. This causes pistoning of the bare optical fiber 7, so that the optical fiber projects from the connection end surface 3 of the ferrule 1. The quantity of the projection the optical fiber projects is adjusted by controlling one or both of the rehardening temperature and the holding time in the atmosphere at the rehardening temperature. In other words, the rehardening temperature is increased and the holding time at the rehardening temperature is extended if the quantity of the projection is to be large. For controlling the projection length of the optical fiber in this manner, experiments are conducted in advance to obtain data regarding a relationship between the rehardening temperature and the quantity of the projection of the optical fiber during the associated holding time. By controlling the rehardening temperature and the associated holding time in accordance with the data, it is possible to obtain a designed projection length of the optical fiber.

After allowing the optical fiber to project in this manner, the atmosphere at this temperature is maintained as shown in FIG. 1(d), so that a crosslinking density of the heat-hardening adhesive 11 changes. This changes the glass-transition temperature of the heat-hardening adhesive 11 to a higher temperature, the Young's modulus of the heat-hardening adhesive 11 increases, and the holding power of the bare optical fiber accordingly increases. After rehardening the heat-hardening adhesive 11 at the rehardening temperature in this manner, the ferrule with the optical fiber projecting is taken out from the heating furnace, thereby completing fabrication of the desired optical connector.

According to the preferred embodiment, the connection end surface 3 is ground and flattened after connecting and fixing the optical fiber, which is inserted through the optical fiber insertion hole 4 of the ferrule 1, at the first hardening temperature, and the ferrule comprising the ground optical fiber cored line conductor is heated once again while controlling the rehardening temperature of the reheating and the corresponding heating time, and hence, it is possible to allow the optical fiber to project uniformly a desired length from the connection end surface 3 of the ferrule 1. This allows optical fibers of optical connectors to abut with each other in a proper pressure contact when the optical connectors are to be connected to each other, and therefore, it is possible to achieve excellent connection using the connectors with only a small connection loss and enhance the reliability of the connection of the optical fibers through the connectors.

Further, since the reheat hardening is performed at the rehardening temperature which is higher than the glass-transition temperature of the heat-hardening adhesive 11 which is determined by the first hardening temperature and the holding time in the atmosphere at the first hardening temperature, it is possible to increase the glass-transition temperature of the heat-hardening adhesive 11. When the rehardening temperature is set higher than a temperature at which the optical connector is to be used, in particular, it is possible to increase the glass-transition temperature of the heat-hardening adhesive 11 sufficiently higher than the temperature at which the optical connector is used.

Thus, by setting the glass-transition temperature of the heat-hardening adhesive 11 higher than the temperature at which the optical connector is to be used, it is possible to prevent without fail a problem of a deteriorated holding power of the optical fiber upon reach of the heat-hardening adhesive 11 to the glass-transition temperature while the optical connector is used, and hence, it is possible to ensure the reliability of the optical connector over a long term. Further, since the glass-transition temperature of the heat-hardening adhesive 11 is set higher than the temperature at which the optical connector is to be used, the heat-hardening adhesive 11 never reaches the glass-transition temperature while the optical connector is used, and therefore, it is possible to prevent pistoning and an associated further projection of the optical fiber during use of the optical connector. Hence, it is possible to sufficiently enhance the reliability of the optical connector.

Now, a specific example of the method of manufacturing an optical connector according to the present invention will be described. The example requires to perform similar steps to those of the preferred embodiment which is shown in FIGS. 1(a) to 1(d), to thereby manufacture an optical connector. More specifically, after inserting the optical fiber cored line 5 through the optical fiber insertion hole 4 of the ferrule 1 and injecting the heat-hardening adhesive 11 which contains an epoxy through the adhesive injecting hole 10, the heat-hardening adhesive 11 was hardened in a heating furnace for one hour at the first hardening temperature of 60° C. After the heat-hardening adhesive 11 was hardened at the first hardening temperature, the glass-transition temperature $T_g$ of the heat-hardening adhesive 11 was 40 to 50° C.

Next, the grinding step was performed as shown in FIG. 1(b) so that the connection end surface 3 of the ferrule 1 and the tip surface of the bare optical fiber 7 were ground to be flat and flush with each other. The quantity of the projection of the optical fiber after the grinding was then measured using a surface roughness meter. The measured quantity of the projection the optical fiber projects was 0.3 to 0.4 μm. A cause of the projection of the optical fiber despite the grinding of the connection end surface 3 of the ferrule 1 and the tip surface of the bare optical fiber 7 so that the surfaces would be flush with each other is considered to be a difference in the ground quantities between the material of the ferrule and the glass material of the optical fiber due to a difference between the hardness of the material of the ferrule and the hardness of the glass material of the optical fiber.

In this example, the experiments were conducted using different samples, and the ground samples were divided into two groups. For one group, the heat-hardening adhesive 11 was heated again for rehardening at the rehardening temperature of 90° C. for the holding time of one hour. For the other group, the heat-hardening adhesive 11 was heated again for rehardening at the rehardening temperature of 100° C. for the holding time of one hour. The glass-transition temperature of the heat-hardening adhesive 11 after the reheat hardening was 80 to 90° C. for the first group which was subjected to the reheat hardening at 90° C. for one hour, but was 100 to 110° C. for the second group which was subjected to the reheat hardening at 100° C. for one hour. Thus, it was proved that the glass-transition temperature of the heat-hardening adhesive 11 can be increased by setting the rehardening temperature high.

Next, the projection lengths of the optical fibers from the connection end surface after the reheat hardening of the heat-hardening adhesive 11 were measured using a surface roughness meter. As a result, the quantities of the projection of the optical fibers after the reheat hardening at 90° C. for one hour were 0.6 to 0.9 μm, while the quantities of the projection of the optical fibers after the reheat hardening at 100° C. for one hour were 1.0 to 1.3 μm. Thus, it was proved that the projection lengths of the optical fibers can be increased by setting the rehardening temperature high.

Next, after the reheat hardening of the heat-hardening adhesive 11, the samples of the respective groups were placed in the heating furnace once again, kept at 80° C. for one hour, and subjected to heat shock, and the projection lengths of the optical fibers were measured again using a surface roughness meter. The projection lengths of the optical fibers of the first group after application of the heat shock were 0.6 to 0.9 μm, while the projection lengths of the optical fibers of the second group were 1.0 to 1.3 μm. Thus, a change in the projection length of the optical fiber due to the heat shock was not observed. This is because the heat shock was applied at a temperature which is lower than the glass-transition temperature of the heat-hardening adhesive after the reheat hardening. In other words, even when heat shock is applied at a temperature which is lower than the glass-transition temperature of the heat-hardening adhesive 11 which is determined by the rehardening temperature, the optical fiber does not project further. It then follows that it was proved that by setting the glass-transition temperature of the heat-hardening adhesive 11 which is determined by the rehardening temperature higher than a temperature at which the optical connector is to be used, it is possible to prevent a change in the projection length of the optical fiber due to the temperature at which the optical connector is used. Table 1 shows measured projection lengths of the optical fibers as they were after the grinding, after the reheat hardening and after application of the heat shock.

TABLE 1

| Step | Rehardening Temperature | |
|---|---|---|
| | 90° C. (one hour) | 100° C. (one hour) |
| After ground | 0.3 ~ 0.4 μm | 0.3 ~ 0.4 μm |
| After reheat hardening | 0.6 ~ 0.9 μm | 1.0 ~ 1.3 μm |
| After heat shock | 0.6 ~ 0.9 μm | 1.0 ~ 1.3 μm |

Further, FIGS. 2(a) to 2(c) and 3(a) to 3(c) show examples of measured projection lengths of the optical fibers which were taken using a surface roughness meter. FIGS. 2(a) to 2(c) show the measurements for the first group which was subjected to the reheat hardening at 90° C., while FIGS. 3(a) to 3(c) show the measurements for the second group which was subjected to the reheat hardening at 100° C. Among FIGS. 2(a) to 2(c) and 3(a) to 3(c), FIGS. 2(a) and 3(a) show the measurements after the grinding, FIGS. 2(b) and 3(b) show the measurements after the reheat hardening, and FIGS. 2(c) and 3(c) show the measurements after the heat shock at 80° C. for one hour. The examples of the measurements shown in FIGS. 2(a) to 2(c) and 3(a) to 3(c) represent an example regarding a multi-cored connector each containing eight cores.

While the example above requires to change the rehardening temperature and keep the holding time at the rehardening temperature constant, another experiment was conducted with a constant rehardening temperature while changing the holding time at the rehardening temperature. From the experiment, it was confirmed that the projection lengths of the optical fibers were increased by extending the holding time.

Hence, it is possible to freely adjust the projection lengths of the optical fibers either by controlling the rehardening temperature variable, controlling the holding time at the rehardening temperature variable, or controlling both the rehardening temperature and the holding time at the rehardening temperature.

The present invention is not limited to the embodiment and examples described above. Rather, various embodiments of the present invention are possible. For example, although the embodiment and examples described above require to perform heating for rehardening only once, the heating for rehardening may be performed twice or more times. In this case, the glass-transition temperature may be gradually increased, such that a reheating temperature for the first time is higher than the glass-transition temperature which is determined by the first hardening temperature but a reheating temperature for the second time is higher than the glass-transition temperature which is determined by the reheating temperature which was used for the first reheating.

INDUSTRIAL APPLICABILITY

As described above, the method of manufacturing an optical connector according to the present invention is appropriate for manufacturing of an optical connector of a one-cored or a multi-cored type in which a tip of an optical fiber projects a little longer from a connection end surface of a ferrule.

What is claimed is:

1. A method of manufacturing an optical connector, the method comprises the following sequence of steps:

inserting an optical fiber through a fiber insertion hole of a ferrule, the optical fiber protruding from a connection end surface of the ferrule;

injecting a heat-hardening adhesive between the ferrule and the optical fiber;

heating the heat-hardening adhesive to a first hardening temperature to harden the adhesive;

grinding the connection end surface of the ferrule and the protruding end surface of the optical fiber so that the surfaces become flush with each other to form an integrated and bonded unit of the ferrule and the optical fiber;

heating the integrated and bonded unit of the ferrule and the optical fiber to a rehardening temperature which is higher than the first hardening temperature and higher than the glass-transition temperature of the heat-hardening adhesive, so that a tip of the optical fiber projects from the connection end surface of the ferrule.

2. The method of manufacturing an optical connector according to claim 1, wherein a projection length the tip of the optical fiber projects from the connection end surface of the ferrule is adjusted by controlling at least one of the rehardening temperature and a holding time at the rehardening temperature.

\* \* \* \* \*

UNITED STATES PATENT AND TRADEMARK OFFICE
CERTIFICATE OF CORRECTION

PATENT NO. : 6,086,704
DATED : July 11, 2000
INVENTOR(S) : Kanai, et. al.

It is certified that error appears in the above-identified patent and that said Letters Patent is hereby corrected as shown below:

All over the text, "C.," should read -- C, --.

Col. 8, line 8, "cf" should read -- of --.

Signed and Sealed this

Twenty-second Day of May, 2001

*Attest:*

NICHOLAS P. GODICI

*Attesting Officer*      Acting Director of the United States Patent and Trademark Office